Oct. 18, 1955  A. M. JACKSON  2,721,275
METHOD OF AND MEANS FOR DETECTING AIRCRAFT
Filed Feb. 21, 1935
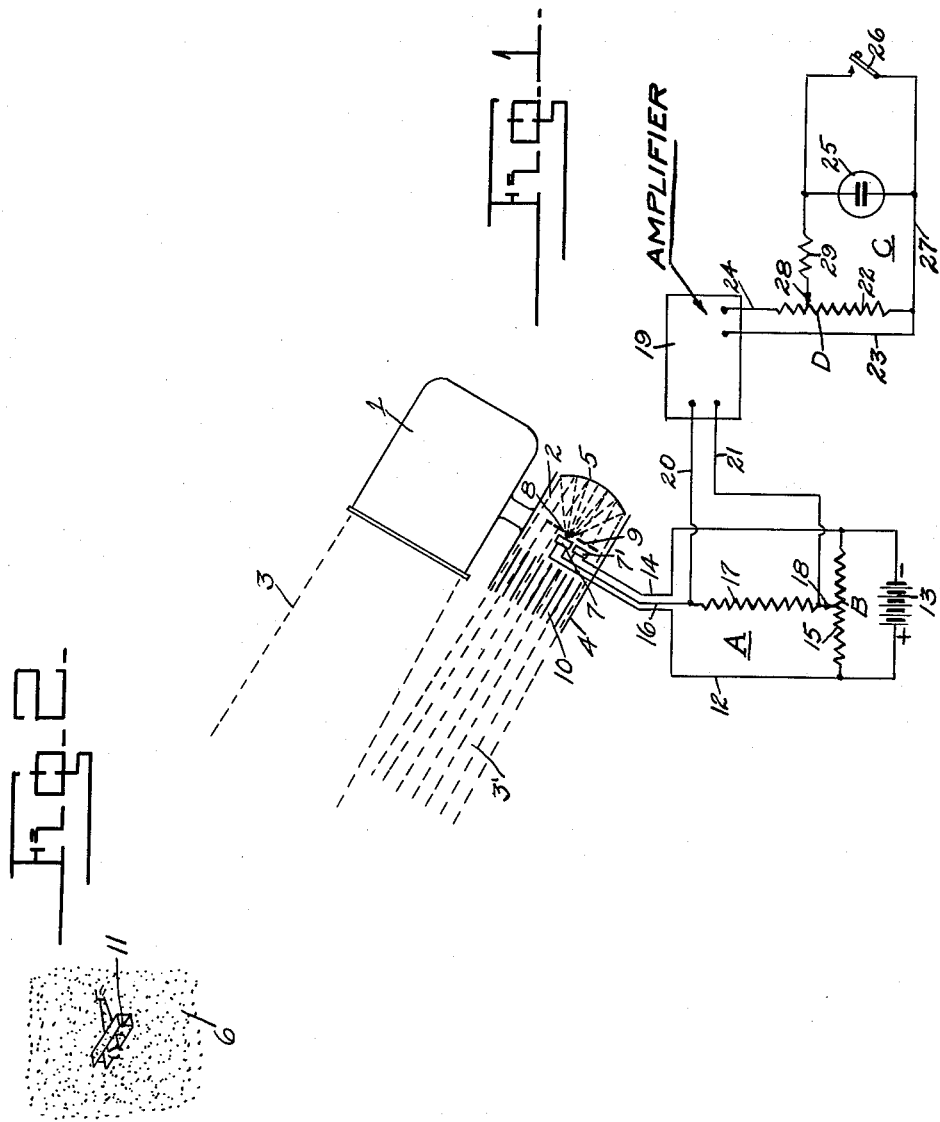
INVENTOR
Albert M. Jackson
BY
ATTORNEY

United States Patent Office 2,721,275
Patented Oct. 18, 1955

2,721,275

METHOD OF AND MEANS FOR DETECTING AIRCRAFT

Albert M. Jackson, Fort Humphreys, Va., assignor to the United States of America as represented by the Secretary of War Application February 21, 1935, Serial No. 7,540

5 Claims. (Cl. 250—83.3)

(Granted under Title 35, U. S. Code (1952), sec. 266)

This invention described herein may be manufactured and used by or for the Government for governmental purposes, without the payment to me of any royalty thereon.

This invention relates to an improved method of and means for detecting the presence of aircraft or other objects.

One of the objects of my invention is to provide a method for detecting the presence of aircraft in flight, or other moving objects in the beam of a searchlight under such conditions of illumination and speed of searching by the searchlight that the unaided eye is incapable of detecting.

Other objects of my invention are to provide means on a searchlight for detecting objects in the beam of the searchlight, to provide means for locating the approximate position of an aircraft in flight or other moving objects which is invisible to the human eye, to provide an instrument which is sensitive to light rays and means for detecting variations in the intensity of the rays received by said instrument and to provide other improvements which will hereinafter appear.

When employing a searchlight for detecting rapidly moving objects such as aircraft the luminous energy of the searchlight which is condensed into a narrow cone or beam, is composed of various visible frequencies, their predominance depending upon the temperature of the arc of the searchlight, cone composition and the like. The condensed cone or beam is visible to the eye due to the fact that solid particles suspended in the atmosphere reflect back to the observer some of the luminous energy, hence the atmosphere can be considered as having reflectivity due to the scattering effect of the suspended matter, the degree of reflectivity depending largely upon the quantity and size of the suspended particles. In searching a certain space in the atmosphere for the rapidly moving objects at a great distance from the searchlight, the low illumination of the beam of the searchlight on the object and the short period the object remains in the beam due to its rapid motion and the rapid displacement of the beam renders the object invisible to the eye.

It is therefore the aim and purpose of this invention to provide a method of and means for utilizing the luminous energy of the searchlight which is reflected back by the suspended particles in the atmosphere to detect the presence of aircraft in flight or other moving objects even though the aircraft is at a great distance from the searchlight and cannot be seen by the eye, said invention being efficient in use and not liable to get out of order.

With the above and other objects and advantages in view, the invention consists in features of construction, arrangement and operation of parts which will hereinafter appear. For purposes of illustration the invention will be described and claimed with reference to the accompanying drawing in which like numbers distinguish like parts and in which—

Fig. 1 is a diagrammatic side elevation of a searchlight equipped with my improved optical instrument for detecting the presence of aircraft or other objects in the beam of the searchlight, together with a diagram of electrical circuits controlled by said instrument; and Figure 2 represents an aircraft to be detected in the beam of the searchlight.

Referring more specifically to the drawing 1 indicates a complete searchlight unit equipped with my approved optical instrument 2 which is mounted integrally with the searchlight in such a manner that the axis of the instrument is maintained parallel to the axis of the beam 3 of the searchlight. The instrument 2 comprises a casing 4 containing an optical system 5 in the rear end thereof which may consist of an objective lens system or a reflector preferably of parabolic form as illustrated. The reflector 5 is adapted to collect the light rays 3' of the beam 3 which are reflected back by the particles 6 in the atmosphere and to focus said rays onto light or wave sensitive elements 7 and 7' of any suitable type such as a photo-conductive, emissive or voltaic cell type. The light or wave sensitive element 7 is placed at the focal point 8 of the reflector 5 whereas the light sensitive element 7' is placed near the focal point of the reflector 5, adjacent the light sensitive element 7. A color filter 9, which is adapted to pass certain rays of the spectrum and to absorb and render inactive other rays thereof, is interposed between the reflector 5 and the light or wave sensitive elements 7 and 7'. A light shield 10 is mounted in front of the reflector 5 which is adapted to narrow the beam so that only a given area of the light rays 3' reflected back by the suspended particles 6 are picked up.

Due to the fact that as the luminous energy from the searchlight passes through increasing quantities of atmosphere and hence encounters increasing numbers of suspended particles of matter, the proportion of the short-wave-lengths that is from the visible to the ultra-violet rays gradually decreases so that at great distances the quality of the light received back is somewhat changed, the longer or infra-red rays predominating, hence the color filter 9 should be of the type that will pass the red and infra-red rays of the spectrum, the particular type of filter being well known.

In Fig. 2 an object 11 in the form of an aircraft is illustrated as being at a great distance from the searchlight 1 in the beam 3 thereof and normally invisible to the human eye because of the low illumination thereon due to its distance and the short period it remains in the searchlight beam.

For the purpose of detecting the presence of the aircraft 11 in the beam of the searchlight the sensitive elements 7 and 7' are connected to an electrical receiving circuit A comprising a conductor 12 leading from the light or wave sensitive element 7 to the positive side of a D. C. potential source 13, such as a battery. The other or negative side of the battery 13 is connected by conductor 14 to the other light or wave sensitive element 7'. Included in the receiving circuit A is a resistance 15 which is connected to the conductors 12 and 14, across the battery 13. The sensitive elements 7 and 7' are connected to the receiving circuit A in electrical opposed relation to each other by means of a common conductor 16 having an input coupling resistor 17 in circuit therewith and terminating in an electrical contact 18 which is adapted to variably contact with the resistance 15 at the central portion thereof, thereby providing a balancing potentiometer B, in the circuit A. The resistor 17 is connected to the input side of any suitable type of amplifier 19 sensitive to electrical energy by means of conductors 20 and 21. The output side of the amplifier 19 is connected at one side thereof to one end of a resistance 22 by means of a conductor 23, the other end of said resistance 22 being connected to the other side of the output of the amplifier 19 by means of conductor 24, thereby placing said resistance in series with said conductors 23 and 24. An indicating circuit C comprising a glow discharge lamp 25 or other suitable indicating device and a key switch 26 in parallel therewith is connected to the resistance 22, one side of said circuit C being connected to one end of the resistance 22 by conductor 27 and the other side thereof contacting with the resistance 22 by means of a variable contact 28 having a ballast resistor 29 in circuit therewith, whereby a trigger potentiometer D is provided in the output side of said amplifier circuit.

In the operation of my invention the light rays 3' which have been reflected back by the suspended particles 6 in the atmosphere after passing through the shield 10 are reflected onto the light or wave sensitive elements 7 and 7' by the reflector 5. Part of this light is composed of parallel rays which are focused on the sensitive element 7 positioned at the focal point of the reflector and another part of the light is composed of diverging or converging rays which produce on the sensitive element 7' some form of image of the beam. The light sensitive elements being connected in the receiving circuit A as illustrated their outputs may be balanced by the potentiometer B and if the intensity of the searchlight should vary, due to arc current fluctuations the effect thereof will be nullified as the sensitive elements are electrically opposed to each other should any solid object enter the beam of the searchlight, such as the aircraft 11, a greater quantity of luminous energy 3' will be reflected back and therefore a greater amount of the parallel rays will be focused onto the light or wave sensitive element 7 by the reflector 5 than converging rays which are reflected onto the sensitive element 7', thereby causing a change in the current of the bias resistor 17 thus unbalancing the circuit. This change in voltage drop is amplified by the amplifier 19 containing the glow discharge lamp 25 in the output side thereof. The potentiometer D is connected to the output side of the amplifier 19 in such a manner that the total drop across it is greater than the break down voltage of the glow discharge lamp and is adapted to be adjusted by the variable contact 28, so that the voltage across the discharge lamp 25 is just below that required to make it glow. Therefore should any solid object enter the searchlight beam an increase of current will be produced in the output side of the amplifier circuit causing the lamp to glow. Closing the key switch 26 across the lamp will extinguish the glow thereof when the normal current level is resumed.

It will thus be seen by the above description of my invention that I have provided a highly novel and useful form of device which is well adapted for all the purposes designated. Even though I have herein described my invention as comprising certain structural features and operations of the various parts thereof, it is nevertheless to be understood various changes may be made therein without departing from the spirit or scope of my invention.

Having described my invention what I claim as new and desire to secure by Letters Patent is:

1. In a receiving system for light rays reflected back from a beam of a light source, the combination with an optical system, of an electrical circuit including a source of electrical energy, dual light sensitive elements connected to said source of energy, one of said light sensitive elements being mounted at the focal point of said optical system and the other of said sensitive elements mounted adjacent to said focal point a resistance shunted across said source of energy, common circuit means connecting said sensitive elements to said resistance and forming an electrically balanced receiving circuit, an amplifier of electrical energy controlled by the potential drop through the common circuit connecting means and an indicating device controlled by said amplifier.

2. The combination of a searchlight and means for detecting the presence of an object in the beam thereof said means comprising a parabolic reflector, a light shield, an electrical circuit, including a source of electrical potential, a photo-conductive cell mounted at the focal point of said reflector, another photo-conductive cell provided adjacent to said focal point a color filter interposed between said photo-conductive cells and said reflector; a resistance shunted across said source of potential, said photo-conductive cells electrically connected in opposed relation to each other and to opposite sides of said common source of potential, common circuit conductor means variably connecting said sensitive elements to said resistance, and forming therewith a balancing potentiometer in said circuit, a resistor connected in said common conductive means, an amplifier of electrical energy connected to said resistor and controlled by the potential drop through the common circuit connecting means and an indicating circuit controlled by said amplifier, said indicating circuit comprising a trigger potentiometer, a glow discharge lamp and a key switch in circuit therewith.

3. A searchlight and means for detecting the presence of an object in the beam thereof, said means comprising a reflector of light rays, a balanced electrical circuit, means for energizing said circuit, elements sensitive to light rays connected in said circuit in electrically opposed relation to each other, one of said sensitive elements mounted at the focal point of said reflector and adapted to receive thereon parallel rays of said beam and another of said sensitive elements mounted adjacent said focal point and adapted to receive thereon rays of said beam other than the said parallel rays whereby an object entering said beam causes the intensity of the beam reflected upon the sensitive element at the said focal point to vary thereby causing an unbalancing of said circuit, and means for indicating the unbalancing of said circuit.

4. A method of detecting aircraft which consists in projecting the beam of a searchlight into the atmosphere, collecting part of the rays of the beam reflected back by the atmosphere, subjecting the rays to filtration to pass only the red and infrared rays, reflecting the collected rays onto wave responsive elements connected in electrical opposition in an electrically balanced receiving circuit, subjecting one of the wave responsive elements to a greater intensity of the reflected rays than another wave responsive element upon an object entering the beam of the searchlight for unbalancing the electrically balanced receiving circuit, obtaining potentiometer measurements of the variations in intensity of the reflected rays, and producing amplified indications of the measurements to determine the presence of an object in the searchlight beam.

5. A method of detecting aircraft which consists in projecting the beam of a searchlight into the atmosphere, collecting part of the rays of the beam reflected back by the atmosphere, filtering the collected rays, reflecting the filtered rays onto wave responsive elements connected in electrical opposition in an electrically balanced receiving circuit, focusing certain of the filtered rays onto one of the wave responsive elements and reflecting other of the filtered rays onto another wave responsive element to vary the intensity of the filtered rays on the wave responsive elements for unbalancing the receiving circuit upon an object entering the beam of the searchlight, obtaining potentiometer measurements of the variations in intensity of the filtered rays reflected on said wave responsive elements and producing amplified indications of the measurements to determine the presence of an object in the searchlight beam.

(References on following page)

References Cited in the file of this patent

UNITED STATES PATENTS

| | | |
|---|---|---|
| 1,385,657 | Bell et al. | July 26, 1921 |
| 1,385,696 | Marshall | July 26, 1921 |
| 1,770,497 | Schroter | July 15, 1930 |
| 1,781,799 | Baird | Nov. 18, 1930 |
| 1,844,146 | Chromy | Feb. 9, 1932 |
| 1,936,514 | Lengnick | Nov. 21, 1933 |
| 1,954,204 | Hayes | Apr. 10, 1934 |

FOREIGN PATENTS

| | | |
|---|---|---|
| 42,464 | Austria | June 10, 1910 |
| 384,325 | Great Britain | Dec. 5, 1932 |